United States Patent Office 3,013,990
Patented Dec. 19, 1961

3,013,990
IRON GROUP METAL CATALYST
Donald W. Breck, Tonawanda, N.Y., Charles R. Castor, Homewood, Ill., and Robert M. Milton, Buffalo, N.Y., assignors to Union Carbide Corporation, a corporation of New York
No Drawing. Continuation of application Ser. No. 762,956, Sept. 24, 1958. This application Sept. 11, 1961, Ser. No. 136,999
16 Claims. (Cl. 252—455)

This invention relates to zeolitic molecular sieves containing at least one material selected from the group consisting of iron, cobalt and nickel and oxides thereof which are suitable for use as improved catalysts.

It has been known that iron, nickel and cobalt and the corresponding oxides are suitable materials for the catalysts of many chemical reactions. For example, at elevated temperatures and reduced pressures they may be employed for the dehydrogenation of alcohols to produce aldehydes and ketones. At lower temperatures and higher pressures these same materials may be employed for the hydrogenation of aldehydes and ketones to alcohols. These materials have also been known to be useful in the reaction between carbon monoxide and hydrogen to produce methane particularly when admixed with alumina.

It is an object of this invention to provide a new composition of matter which is a superior catalyst.

Other objects will be apparent from the subsequent disclosure and appended claims.

The composition of matter which satisfies the objects of the present invention comprises a zeolitic molecular sieve containing a substantial quantity of at least one material selected from the group consisting of iron, nickel and cobalt and oxides thereof in the internal adsorption area of the zeolitic molecular sieve. This composition of matter contains the metal in a form having a high specific surface which is suitable for chemisorption and catalysis.

Zeolitic molecular sieves, both natural and synthetic, are metal aluminosilicates. The crystalline structure of these materials is such that a relatively large adsorption area is present inside each crystal. Access to this area may be had by way of openings, or pores, in the crystal. Molecules are selectively adsorbed by molecular sieves on the basis of their size and polarity, among other things.

Zeolitic molecular sieves consist basically of three-dimensional frameworks of $SiO_4$ and $AlO_4$ tetrahedra. The tetrahedra are cross-linked by the sharing of oxygen atoms. The electrovalence of the tetrahedra containing aluminum is balanced by the inclusion in the crystal of a cation, for example metal ions, ammonium ions, amine complexes, or hydrogen ions. The spaces between the tetrahedra may be occupied by water or other adsorbate molecules.

The zeolites may be activated by driving off substantially all of the water of hydration. The space remaining in the crystals after activation is available for adsorption of adsorbate molecules. Any of this space not occupied will be available for adsorption of molecules having a size, shape, and energy which permits entry of the adsorbate molecules into the pores of the molecular sieves.

The zeolitic molecular sieves to be useful in the present invention, must be capable of adsorbing oxygen molecules at the normal boiling point of oxygen. Included among these are the preferred natural zeolitic molecular sieves, chabazite, faujasite, erionite, mordenite, gmelinite, and the calcium form of analcite, and the preferred synthetic zeolitic molecular sieves, zeolite A, D, L, R, S, T, X, and Y. The natural materials are adequately described in the chemical art. The characteristics of the synthetic materials and processes for making them are provided below.

The general formula for zeolite X, expressed in terms of mol fractions of oxides, is as follows:

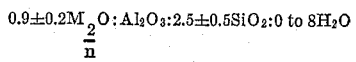

In the formula "M" represents a cation, for example hydrogen or a metal, and "$n$" its valence. The zeolite is activated or made capable of adsorbing certain molecules by the removal of water from the crystal as by heating. Thus the actual number of mols of water present in the crystal will depend upon the degree of dehydration or activation of the crystal. Heating to temperatures of about 350° C. has been found sufficient to remove substantially all of the adsorbed water.

The cation represented in the formula above by the letter "M" can be changed by conventional ion-exchange techniques. The sodium form of the zeolite, designated sodium zeolite X, is the most convenient to manufacture. For this reason the other forms of zeolite X are usually obtained by the modification of sodium zeolite X.

The typical formula for sodium zeolite X is $$0.9\ Na_2O:Al_2O_3:2.5\ SiO_2:6.1\ H_2O$$

The major lines in the X-ray diffraction pattern of zeolite X are set forth in Table A below:

TABLE A

| $d$ Value of Reflection in A. | 100 $I/I_0$ |
|---|---|
| 14.42±0.2 | 100 |
| 8.82±0.1 | 18 |
| 4.41±0.05 | 9 |
| 3.80±0.05 | 21 |
| 3.33±0.05 | 18 |
| 2.88±0.05 | 19 |
| 2.79±0.05 | 8 |
| 2.66±0.05 | 8 |

In obtaining the X-ray diffraction powder patterns, standard techniques were employed. The radiation was the KαC doublet of copper, and a Geiger counter spectrometer with a strip chart pen recorder was used. The peak heights, I, and the positions as a function of 2θ, where θ is the Bragg angle, were read from the spectrometer charge. From these, the relative intensities,

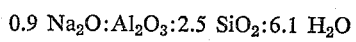

where $I_0$ is the intensity of the strongest line or peak, and $d(obs)$, the interplanar spacing in A., corresponding to the recorded lines were calculated. The X-ray patterns indicate a cubic unit cell of dimensions between 24.5 A. and 25.5 A.

To make sodium zeolite X, reactants are mixed in aqueous solution and held at about 100° C. until the crystals of zeolite X are formed. Preferably the reactants should be such that in the solution the following ratios prevail:

$SiO_2/Al_2O_3$ _____ 3–5
$Na_2O/SiO_2$ _____ 1.2–1.5
$H_2O/Na_2O$ _____ 35–60

The general formula for zeolite A, expressed in terms of mol fractions of oxides is as follows:

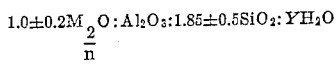

In the formula, "M" represents a metal and "$n$" its valence, and "Y" may be any value up to 6. The zeolite is activated, or made capable of adsorbing certain molecules by the removal of water from the crystal, as by heating. Thus the actual number of mols of water present in the crystal will depend upon the degree of dehydration or activation of the crystal.

As in the case of zeolite X, the metal represented in the formula by the letter "M" can be changed by conventional ion-exchange techniques. For purposes of convenience the sodium form of zeolite A, designated sodium zeolite A, is synthesized and other forms obtained by the modification of the sodium zeolite A.

A typical formula for sodium zeolite A is $$0.99Na_2O:1.0Al_2O_3:1.85SiO_2:5.1H_2O$$

The major lines in the X-ray diffraction pattern of zeolite A are set forth in Table B below:

TABLE B

| $d$ Value of Reflection in A. | 100 $I/I_0$ |
| --- | --- |
| 12.2±0.2 | 100 |
| 8.6±0.2 | 69 |
| 7.05±0.15 | 35 |
| 4.07±0.08 | 36 |
| 3.68±0.07 | 53 |
| 3.38±0.06 | 16 |
| 3.26±0.05 | 47 |
| 2.96±0.05 | 55 |
| 2.73±0.05 | 12 |
| 2.60±0.05 | 22 |

The same procedures and techniques were employed in obtaining the patterns described in Tables A and B.

To make sodium zeolite A, reactants are mixed in aqueous solution and heated at about 100° C. until the crystals of zeolite A are formed. Preferably the reactants should be such that in the solution the following ratios prevail:

$SiO_2/Al_2O_3$ ---------- 0.5–1.3
$Na_2O/SiO_2$ ---------- 1.0–3.0
$H_2O/Na_2O$ ---------- 35–200

The chemical formula for zeolite Y expressed in terms of oxides mole ratios may be written as $$0.9±0.2Na_2O:Al_2O_3:WSiO_2:XH_2O$$

wherein "W" is a value greater than 3 up to about 5 and "X" may be a value up to about 9.

Zeolite Y has a characteristic X-ray powder diffraction pattern which may be employed to identify zeolite Y. The X-ray powder diffraction data are shown in Table C. The values for the interplanar spacing, $d$, are expressed in angstrom units. The relative intensity of the lines of the X-ray powder diffraction data are expressed as VS, very strong; S, strong; M, medium; W, weak; and VW, very weak.

TABLE C

| $hkl$ | $h^2+k^2+l^2$ | $d$ in A. | Intensity |
| --- | --- | --- | --- |
| 111 | 3 | 14.3–14.4 | VS |
| 220 | 8 | 8.73–8.80 | M |
| 311 | 11 | 7.45–7.50 | M |
| 331 | 19 | 5.67–5.71 | S |
| 333, 511 | 27 | 4.75–5.03 | M |
| 440 | 32 | 4.37–4.79 | M |
| 620 | 40 | 3.90–4.46 | W |
| 533 | 43 | 3.77–3.93 | S |
| 444 | 48 | 3.57–3.79 | VW |
| 551, 711 | 51 | 3.46–3.48 | VW |
| 642 | 56 | 3.30–3.33 | S |
| 553, 731 | 59 | 3.22–3.24 | W |
| 733 | 67 | 3.02–3.04 | M |
| 660, 822 | 72 | 2.91–2.93 | M |
| 555, 751 | 75 | 2.85–2.87 | S |
| 840 | 80 | 2.76–2.78 | M |
| 753, 911 | 83 | 2.71–2.73 | W |
| 664 | 88 | 2.63–2.65 | M |
| 931 | 91 | 2.59–2.61 | M |
| 844 | 96 | 2.52–2.54 | VW |
| 862; 10, 2, 0 | 104 | 2.42–2.44 | VW |
| 666; 10, 2, 2 | 108 | 2.38–2.39 | M |
| 775; 11, 1, 1 | 123 | 2.22–2.24 | VW |
| 880 | 128 | 2.18–2.20 | W |
| 955; 971; 11, 3, 1 | 131 | 2.16–2.18 | VW |
| 973; 11, 3, 3 | 139 | 2.10–2.11 | W |
| 884; 12, 0, 0 | 144 | 2.06–2.07 | VW |
| 886; 10, 8, 0; 12, 4, 2 | 164 | 1.93–1.94 | VW |
| 10, 8, 2 | 168 | 1.91–1.92 | VW |
| 995; 13, 3, 3 | 187 | 1.81–1.82 | VW |
| 11, 7, 5; 13, 5, 1 | 195 | 1.77–1.78 | VW |
| 10, 8, 6; 10, 10, 0; 14, 2, 0 | 200 | 1.75–1.76 | W |
| 997; 11, 9, 3 | 211 | 1.70–1.71 | W |

When an aqueous colloidal silica sol employed as the major source of silica, zeolite Y may be prepared by preparing an aqueous sodium aluminosilicate mixture having a composition, expressed in terms of oxide-mole-ratios, which falls within one of the following ranges:

| | Range 1 | Range 2 | Range 3 |
| --- | --- | --- | --- |
| $Na_2O/SiO_2$ | 0.20 to 0.40 | 0.41 to 0.61 | 0.61 to 0.80 |
| $SiO_2/Al_2O_3$ | 10 to 40 | 10 to 30 | 7 to 30 |
| $H_2O/Na_2O$ | 25 to 60 | 20 to 60 | 20 to 60 | maintaining the mixture at a temperature of about 100° C. until crystals are formed, and separating the crystals from the mother liquor.

When sodium silicate is employed as the major source of silica, zeolite Y may be prepared by preparing an aqueous sodium aluminosilicate mixture having a composition, expressed in terms of oxide-mole ratios, falling within one of the following ranges:

| | Range 1 | Range 2 | Range 3 |
| --- | --- | --- | --- |
| $Na_2O/SiO_2$ | 0.6 to 1.0 | 1.5 to 1.7 | 1.9 to 21 |
| $SiO_2/Al_2O_3$ | 8 to 30 | 10 to 30 | about 10 |
| $H_2O/Na_2O$ | 12 to 90 | 20 to 90 | 40 to 90 | maintaining the mixture at a temperature of about 100° C. until crystals are formed, and separating the crystals from the mother liquor.

The composition of zeolite L, expressed in terms of mole ratios of oxides, may be represented as follows:

wherein "M" designates a metal, "$n$" represents the valence of "M"; and "$y$" may be any value from 0 to about 7.

The more significant $d(A.)$ values, i.e., interplanar spacings, for the major lines in the X-ray diffraction pattern of zeolite L, are given below in Table D.

TABLE D

| | |
|---|---|
| 16.1±0.3 | 3.17±0.01 |
| 7.52±0.04 | 3.07±0.01 |
| 6.00±0.02 | 2.91±0.01 |
| 4.57±0.03 | 2.65±0.01 |
| 4.35±0.04 | 2.46±0.01 |
| 3.91±0.02 | 2.42±0.01 |
| 3.47±0.02 | 2.19±0.01 |
| 3.28±0.02 | |

Although there are a number of cations that may be present in zeolite L, it is preferred to synthesize the potassium and potassium-sodium forms of the zeolite, i.e., the form in which the exchangeable cations present are substantially all potassium or potassium and sodium ions. The reactants accordingly employed are readily available and generally water soluble. The exchangeable cations present in the zeolite may then conveniently be replaced by other exchangeable cations.

The potassium or potassium-sodium forms of zeolite L may be prepared by preparing an aqueous metal alumino-silicate mixture having a composition, expressed in terms of mole ratios of oxides falling within the following range:

$K_2O/(K_2O+Na_2O)$ ------ From about 0.33 to about 1.
$(K_2O+Na_2O)/SiO_2$ ------ From about 0.4 to about 0.5.
$SiO_2/Al_2O_3$ -------------- From about 15 to about 28.
$H_2O/(K_2O+Na_2O)$ ------ From about 15 to about 41.

maintaining the mixture at a temperature of about 100° C. until crystallization occurs, and separating the crystals from the mother liquor.

The chemical formula for zeolite D may be written, in terms of oxides, as follows:

$$0.9\pm0.2[xNa_2O:(1-x)K_2O]:Al_2O_3:wSiO_2:yH_2O$$

wherein "$x$" is a value from 0 to 1, "$w$" is from about 4.5 to about 4.9, and "$y$," in the fully hydrated form, is about 7. In the preferred form of zeolite D, "$x$" is in the range of from 0.4 to 0.6.

Zeolite D has an X-ray powder diffraction pattern substantially like that shown in Table E.

TABLE E

*X-ray diffraction patterns of zeolite D*

[$d$=interplanar spacing in A.: I/I max.=relative intensity]

| Zeolite D | |
|---|---|
| d, A. | I/I max. |
| 9.42 | 66 |
| 6.89 | 67 |
| 5.54 | 15 |
| 5.03 | 62 |
| 4.33 | 62 |
| 3.98 | 27 |
| 3.89 | 23 |
| 3.60 | 12 |
| 3.45 | 39 |
| 3.19 | 15 |
| 2.94 | 100 |
| 2.69 | 9 |
| 2.61 | 38 |
| 2.30 | 16 |
| 2.09 | 22 |
| 1.81 | 29 |
| 1.73 | 23 |

Zeolite D may be prepared as follows:

A sodium-potassium aluminosilicate-water mixture is prepared such that the initial composition of the reactant mixture in terms of oxide-mole-ratios is:

$$\frac{Na_2O+K_2O}{SiO_2}=0.45 \text{ to } 0.65$$

$$\frac{Na_2O}{Na_2O+K_2O}=0.74 \text{ to } 0.92$$

$$\frac{SiO_2}{Al_2O_3}=\text{about } 28$$

$$\frac{H_2O}{Na_2O+K_2O}=18 \text{ to } 45$$

The mixture is maintained at a temperature within the range of about 100° C. to 120° C. until crystals are formed; the crystals are then separated from the mother liquor.

The chemical formula for zeolite R may be written as:

$$0.9\pm0.2Na_2O:Al_2O_3:WSiO_2:XH_2O$$

wherein "$W$" is from 3.45 to 3.65, and "$X$," for the fully hydrated form, is about 7.

Zeolite R has an X-ray powder diffraction pattern substantially like that shown in Table F.

TABLE F

*X-ray diffraction patterns of zeolite R*

[$d$=interplanar spacing in A.: I/I max.=relative intensity]

| Zeolite R | |
|---|---|
| d, A. | 100 (I/I max.) |
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 3.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 |

Zeolite R may be prepared as follows:

A sodium aluminosilicate-water mixture is prepared such that the initial composition of the reactant mixture, in terms of oxide-mole-ratios, falls within any one of the following seven ranges:

| | I | II | III | IV | V | VI | VII |
|---|---|---|---|---|---|---|---|
| $Na_2O/SiO_2$ | 0.20 to 0.40 | 0.41 to 0.60 | 0.61 to 0.80 | 0.81 to 1.0 | 0.81 to 1.0 | 1.7 to 1.9 | 1.2 to 1.4 |
| $SiO_2/Al_2O_3$ | about 4 | 3.5 to 6.0 | 3.5 to 6.5 | 3 to 4.5 | about 30 | 10 to 25 | about 6 |
| $H_2O/Na_2O$ | 22 to 60 | 30 to 60 | 40 to 80 | 40 to 80 | 50 to 60 | 60 to 70 | 80 to 90 |

The mixture is maintained at a temperature with the range of about 100° C. to 120° C. until crystals are formed; the crystals are then separated from the mother liquor.

The chemical formula for zeolite S may be written as:

$$0.9 \pm 0.2 Na_2O : Al_2O_3 : W SiO_2 : X H_2O$$

wherein "$W$" is from 4.6 to 5.9 and "$X$," for the fully hydrated form, is from about 6 to 7.

Zeolite S has a characteristic X-ray powder diffraction pattern which may be employed to identify zeolite S. The X-ray powder diffraction data are shown in Table G.

TABLE G
*X-ray diffraction patterns of synthetic zeolite S*

[$d$ = interplanar spacing in A.: I/I max. = relative intensity]

| $d$, A. | 100 ($I/I$ max.) |
|---|---|
| 11.88 | 77 |
| 7.73 | 19 |
| 7.16 | 100 |
| 5.96 | 9 |
| 5.03 | 72 |
| 4.50 | 46 |
| 4.12 | 79 |
| 3.97 | 20 |
| 3.44 | 62 |
| 3.305 | 13 |
| 3.236 | 23 |
| 2.973 | 80 |
| 2.858 | 47 |
| 2.693 | 19 |
| 2.603 | 39 |
| 2.126 | 11 |
| 2.089 | 39 |
| 1.910 | 12 |
| 1.809 | 40 |
| 1.722 | 32 |

Zeolite S may be prepared by preparing a sodium aluminosilicate-water mixture such that the composition of the reactant mixture, in terms of oxide-mole ratios, falls within the following range when the source of silica is an aqueous colloidal silica sol:

| | |
|---|---|
| $Na_2O/SiO_2$ | 0.3 to 0.6 |
| $SiO_2/Al_2O_3$ | 6 to 10 |
| $H_2O/Na_2O$ | 20 to 100 | and falls within the following range when the source of silica is sodium silicate:

| | |
|---|---|
| $Na_2O/SiO_2$ | about 0.5 |
| $SiO_2/Al_2O_3$ | about 25 |
| $H_2O/Na_2O$ | about 18 | maintaining the mixture at a temperature in the range of from about 80° C. up to about 120° C., preferably at about 100° C., and at a pressure at least equal to the vapor pressure of water in equilibrium with the mixture of reactants until crystals are formed, and separating the crystals from the mother liquor.

The chemical formula for zeolite T may be written, in terms of mole ratios of oxides, as follows:

$$1.1 \pm 0.4 [xNa_2O : (1-x)K_2O] : Al_2O_3 : 6.9 \pm 0.5\ SiO_2 : yH_2O$$

wherein "$x$" may be any value from about 0.1 to about 0.8, and "$y$" may be any value from about 0 to about 8. Zeolite T may be identified and distinguished from other zeolites, and other crystalline substances, by its X-ray powder diffraction pattern. The data which are set forth below in Table H are for a typical example of zeolite T.

TABLE H

| Bragg Angle, $2\theta$ | Interplanar Spacing, $d$ (A.) | Relative Intensity, 100 $I/I_0$ |
|---|---|---|
| 7.72 | 11.45 | 100 |
| 9.63 | 9.18 | 4 |
| 11.74 | 7.54 | 13 |
| 13.35 | 6.63 | 54 |
| 14.74 | 6.01 | 2 |
| 15.44 | 5.74 | 6 |
| 17.78 | 4.99 | 2 |
| 19.43 | 4.57 | 8 |
| 20.46 | 4.34 | 45 |
| 21.35 | 4.16 | 3 |
| 21.78 | 4.08 | 2 |
| 23.27 | 3.82 | 16 |
| 23.64 | 3.76 | 56 |
| 24.28 | 3.67 | 1 |
| 24.82 | 3.59 | 30 |
| 26.04 | 3.42 | 2 |
| 26.92 | 3.31 | 16 |
| 28.04 | 3.18 | 12 |
| 28.29 | 3.15 | 18 |
| 30.47 | 2.93 | 11 |
| 31.15 | 2.87 | 38 |
| 31.38 | 2.85 | 45 |
| 33.41 | 2.68 | 11 |
| 34.32 | 2.61 | 2 |
| 35.83 | 2.51 | 8 |
| 36.09 | 2.49 | 13 |
| 39.26 | 2.30 | 2 |
| 40.81 | 2.21 | 6 |
| 42.61 | 2.12 | 5 |
| 43.33 | 2.09 | 3 |
| 45.58 | 1.99 | 2 |
| 46.30 | 1.96 | 2 |
| 48.17 | 1.89 | 8 |
| 48.84 | 1.86 | 2 |
| 49.61 | 1.84 | 4 |
| 51.44 | 1.78 | 8 |
| 51.58 | 1.77 | 5 |
| 52.29 | 1.75 | 2 |
| 53.68 | 1.71 | 3 |
| 55.40 | 1.66 | 9 |
| 58.03 | 1.59 | 5 |
| 60.82 | 1.52 | 1 |
| 61.48 | 1.51 | 2 |
| 63.29 | 1.47 | 3 |
| 66.24 | 1.41 | 1 |
| 67.65 | 1.38 | 3 |

Zeolite T may be prepared by preparing an aqueous sodium-potassium aluminosilicate mixture having a composition, expressed in terms of mole ratios of oxides, falling within the following range:

| | |
|---|---|
| $Na_2O/(Na_2O+K_2O)$ | From about 0.7 to about 0.8. |
| $(Na_2O+K_2O)/SiO_2$ | From about 0.4 to about 0.5. |
| $SiO_2/Al_2O_3$ | About 20 to 28. |
| $H_2O/(Na_2O+K_2O)$ | About 40 to 42. | maintaining the mixture at a temperature of about 100° C. until crystallization occurs, and separating the crystals from the mother liquor.

Several methods are available for incorporating the iron, cobalt, and nickel in the zeolitic molecular sieve. The first of these comprises intimately contacting the zeolitic molecular sieve with an aqueous solution of a water-soluble salt of the metal to be deposited in the inner adsorption area of the zeolitic molecular sieve whereby ion-exchange of the metal cations of the zeolitic molecular sieve in the aqueous solution occurs; separating the zeolitic molecular sieve from the aqueous exchanging solution; drying the zeolitic molecular sieve whereby substantially all of the water is removed from the zeolitic molecular sieve; and intimately contacting the zeolitic molecular sieve with a reducing agent such as alkali metal vapors or gaseous hydrogen whereby the cations of the metal to be deposited, i.e., the iron, nickel and/or cobalt, are reduced to the elemental metal.

In an example of the invention 100 grams of zeolite X were placed in a 16 millimeter (inside diameter) glass column to a bed depth of 70 centimeters. A 0.22 molar nickel-nitrate solution (128 grams $Ni(NO_3) \cdot 6H_2O$ in two liters of water) was passed upwards through this column at a rate of 10 milliliters per minute. The zeolite was washed after completion of exchange by passing 500 milliliters of distilled water through the column. The zeolite was then removed from the column and dried at 100° C. X-ray diffraction analysis of the dried product showed the crystal structure to be intact.

The nickel-exchanged zeolite was placed in a vertical tube and heated under a hydrogen purge of 0.5 cubic feet per hour at 300° C. to 350° C. for 3 hours until dehydrated. The temperature was then increased to 500° C. for 3 hours while still under the hydrogen purge to accomplish hydrogen reduction of the nickel-exchanged zeolite. The zeolite was then cooled overnight under 5 p.s.i.g. hydrogen. The product was uniformly black. X-ray diffraction analysis of the zeolite indicated the presence of elemental nickel. Chemical analysis of the product indicated 8.6 weight-percent of nickel.

In another example a solution of iron nitrate was prepared by dissolving 20.2 grams of iron nitrate $$(Fe(NO_3)_3 \cdot 9H_2O)$$

in one liter of distilled water. The solution was slurried with 100 grams of zeolite X and allowed to stand for 10 minutes. The zeolite was filtered and dried at 100° C. for 3 hours. The iron-exchanged zeolite containing 2.4 weight-percent iron was then placed in a horizontal tube furnace and heated under 2 cubic feet per hour of hydrogen at 300° C. to 320° C. for 10 hours. The bed color changed from yellow-brown to gray-brown. Chemical analysis of the product indicated 3.2 weight-percent iron.

Another method for obtaining the product of the present invention comprises contacting the zeolitic molecular sieve with an equeous solution of a metal-amine, complex cation of iron, cobalt or nickel whereby ion-exchange occurs between the complex cations and the exchangeable cations of the zeolitic molecular sieve; drying said ion-exchanged zeolitic molecular sieve; activating said dried, ion-exchanged zeolitic molecular sieve in an inert atmosphere; and reducing the complex cations in said activated zeolitic molecular sieve to the elemental metal by heating said zeolitic molecular sieve up to a temperature of about 350° C. in a flowing stream of inert dried gas or in vacuum whereby the complex cation is destroyed thereby depositing the metal in a very highly dispersed form in the inner adsorption area of said zeolitic molecular sieve and cooling the product. This method is limited to the loading of zeolitic molecular sieves which have a pore size sufficiently large to permit adsorption of benzene. Molecular sieves having smaller pores will not satisfactorily permit entry of the metal-amine complex cations into the inner adsorption area of the crystal.

It may be seen that the maximum metal that may be incorporated in the zeolitic molecular sieves in the foregoing ion-exchange processes is limited by the extent to which the molecular sieves may be ion-exchanged with the deposited cations. However, since the metal is distributed throughout the molecular sieves according to the location of the ion-exchange site of the crystals it is possible to obtain a high degree of dispersion of the metal throughout the crystals and the contained metal has a very high specific surface.

Still another method which is suitable for preparing the products of the present invention comprises intimately contacting an activated zeolitic molecular sieve in an inert atmosphere with a fluid decomposable compound of iron, nickel or cobalt whereby the decomposable compound is adsorbed by the zeolitic molecular sieve in its inner adsorption region. The decomposable compound may then be reduced whereby the elemental metal is deposited and retained in the inner adsorption region. As with the foregoing method wherein ion-exchange with complex cations is employed, this process is limited to the loading of molecular sieves which are capable of adsorbing benzene.

Iron, nickel or cobalt carbonyls or carbonyl hydrides are suitable as the decomposable compounds. The reduction of the material may be either chemical or thermal. To illustrate this process, 22.7 grams of zeolite X were activated by heating to about 350° C. The activated zeolite was treated with volatile iron pentacarbonyl under reduced pressure until adsorption of the carbonyl by the zeolite ceased. The treated material was heated slowly to 250° C. under a purging stream of nitrogen until the iron pentacarbonyl was decomposed leaving elemental iron in the crystals of zeolite X. The zeolite assumed a deep purple color. It was found that the iron-loaded zeolite was highly reactive to oxidation. As soon as the material was exposed to air, the color of a portion of it changed from purple to the characteristic color of iron oxide while some of the iron-loaded zeolite turned black after the exposure. It was shown by the behaviour of the material in a magnetic field that the different colors were due to the presence of different oxides of iron. The oxidized material was analyzed. The results of the analysis indicated 8.1 weight-percent iron in the zeolite pores. Adsorption data indicated that the iron-loaded zeolite contained 8.2 weight-percent iron prior to the decomposition of the iron carbonyl. This agreement in iron content indicated that a negligible amount of $Fe(CO)_5$ was desorbed in the decomposition process and that practically quantitative decomposition took place.

The preparation of nickel-loaded zeolite X was carried out in the same manner as the preparation of the iron-containing material except that nickel tetracarbonyl was used. The resulting product was similar to the iron-loaded zeolite except that it was a gray color. No noticeable color change occurred on exposure to air.

At pressures of between about 1000 and 2000 p.s.i.g. and at temperatures of from about 100° C. to 140° C. nickel and cobalt cyclopentadienyl break down in the presence of hydrogen to form nickel and cobalt respectively. To illustrate this bis(cyclopentadienyl) nickel (10 grams) was dissolved in 100 milliliters of n-heptane at 95° C. Zeolite X powder (50 grams) which had previously been activated at 375° C. was added, and the slurry was refluxed in an argon atmosphere for two hours. This was done to allow diffusion of the nickel compound into the pores of the zeolite. The slurry was transferred to a 300 milliliter pressure vessel and put in an autoclave. Hydrogen gas was introduced into the vessel until the pressure reached 1200 p.s.i.g. The temperature of the reactor and contents was slowly increased at the rate of about 1° C. per minute. At 80° C. a slight pressure drop of 1280 to 1200 p.s.i.g. occurred followed by a leveling off of the pressure. This indicated adsorption of the hydrogen by the zeolite. At 105° C. a major pressure drop occurred from 1200 to 1000 p.s.i.g. The pressure leveled off at about 1000 p.s.i.g. This pressure drop indicated hydrogenation of the cyclopentadienyl compound. The vessel was then cooled to room temperature, vented, and the slurry was removed to be dried under an inert atmosphere. The nickel-containing zeolite product was a uniform jet-black color.

To illustrate the multiple loading of metals in a molecular sieve, 0.509 gram of activated sodium X powder was cyclically treated by adsorption of nickel carbonyl vapors at 25° C. following by heating to between 160° C. and 185° C. to decompose the nickel carbonyl while at the same time evacuating the evolved carbon monoxide. After 43 cycles, the sample weight had increased 212 weight-percent. It was estimated that at this point about 80 percent of the volume of the large pores of the molecular sieve were filled with elemental metal. The product exhibited ferromagnetic properties.

These metal-loaded zeolitic molecular sieves may be advantageously utilized in electrical and/or magnetic applications since they retain ferromagnetic properties even while located in the inner adsorption region of the zeolitic molecular sieves.

In addition to the uses described previously these iron-loaded molecular sieves find useful application as catalysts for the synthesis of ammonia and as a Fischer Tropsch catalyst. Similarly, cobalt-loaded molecular sieve are suitable Fischer Tropsch hydrocarbon synthesis catalysts. Nickel-loaded molecular sieves are quite useful as hydrogenation catalysts in the catalysis of the reaction wherein methane is reacted with steam to produce carbon monoxide and hydrogen as a methanation catalyst and as an isomerization catalyst.

While it is true that in the utilization of these materials for catalytic purposes they have often been supported by alumina, silica, mixtures thereof and alumino-silicates; when contained in the inner adsorption area of molecular sieves as in the present application they provide superior catalysts because the products contain the metal in the finest possible distribution, the metal being in a highly active form. The molecular sieves have a higher surface area than any of the carrier supports. The uniform structure of the molecular sieves provide uniform activity throughout the entire catalytic surface. Further, certain properties characteristic of zeolitic molecular sieves still further enhance the use of the metal-loaded products. For example, by properly selecting the pore size and the crystal structure by proper selection of molecular sieves it is possible to obtain the most favorable conditions for a given reaction even to the point of carrying on reactions in the presence of other materials which would normally interfere with the reaction. The selectivity of the various molecular sieves will in many cases exclude the interfering materials from the catalytic surface while in no way preventing the desired materials from contacting this surface. Further the chemical and catalytic nature of the surface. Further the chemical and catalytic nature of the molecular sieve itself may be altered to suit the requirements of the reactants by the selection of the most suitable cation present in the molecular sieve structure.

A cobalt-loaded zeolitic molecular sieve was prepared by treating activated sodium zeolite X with a chloroform solution of cobalt acetylacetonate until the cobalt acetylacetonate was adsorbed. The contained acetylacetonate was then decomposed by heating the molecular sieve for four hours at a temperature of about 350° C. in a stream of hydrogen. The product contained about 0.3 weight-percent of cobalt.

The metal-loaded molecular sieves may be employed to prepare the oxide catalysts by simple oxidation of the metals to the corresponding oxides. This may be accomplished by merely exposing the metal-loaded molecular sieves to air in many cases. More satisfactory results will be obtained however, by exposing the molecular sieves to oxygen at elevated temperatures. These metal oxide-bearing molecular sieves may then be employed for catalysts in the reactions described previously. All of the advantages which accrue from the utilization of molecular sieves loaded with catalytic materials are obtained by using metal oxide-loaded molecular sieves in appropriate catalytic reactions.

These oxide-loaded molecular sieves are useful as catalysts. For example, cobalt oxide is useful in hydrodesulfurization. The iron-oxide is useful in the conversion of carbon monoxide and water to carbon dioxide and hydrogen.

To illustrate the utility of the products of the present invention nickel-loaded sodium zeolite X containing approximately 8 weight-percent of nickel was employed as a catalyst for the hydrogenation of acetone. Hydrogen was passed through a bubbler containing acetone. The resulting gas mixture was passed through a pre-heater and then through a reactor having an internal diameter of 1.5 inches and containing 110 cubic centimeters of the catalyst. The resulting product was collected in a Dry Ice trap. The reactants were passed over the catalyst bed at the rate of 14.7 grams per hour of acetone and 18 liters per hour of hydrogen. The temperature was maintained at about 200° C. There was a conversion of about 75 percent to isopropanol.

Ammonia was prepared from nitrogen and hydrogen employing a catalyst of the present invention; a catalyst bed containing 37 grams of sodium zeolite X in pellet form (through 14 on 30 mesh pellets) containing 6-weight percent iron. A stream of gas consisting of 74 volume percent of hydrogen and 24 volume percent of nitrogen at a temperature of 440° C. and a pressure of 35 atmospheres was passed through the catalyst for 23 hours. The flow rate of the gas stream was adjusted to a space velocity of 120 standard cubic feet per hour per cubic foot of catalyst. It was found that the yield of ammonia by this synthesis process is favored by higher temperatures.

The nickel-loaded molecular sieves are extremely useful for removing carbon monoxide from gas streams, for example, by removing carbon monoxide from hydrogen that is to be used in catalytic hydrogenation and ammonia synthesis. Nickel-loaded sodium zeolite X containing about 8 percent nickel has been found to adsorb 11.7 weight-percent carbon monoxide at 750 millimeters of mercury of carbon monoxide pressure. When the material is so employed the carbon monoxide may be removed merely by elevating the temperature and lowering the pressure. Thus the material may be used in cyclic processes by adsorbing and desorbing the carbon monoxide. The usual alumina and aluminosilicate coated with nickel are not useful in this manner because the carbon monoxide reacts with the nickel to form nickel carbonyl which is evolved in the desorption step instead of the carbon monoxide. In the process employed nickel-loaded molecular sieves primarily carbon monoxide is evolved; this is presumed to arise from the fact that the strong bonding forces of the molecular sieve prevent the desorption of the nickel and nickel carbonyl.

As used herein the term "activation" is employed to designate the removal of water from the zeolitic molecular sieves, i.e., dehydration, and does not refer to catalytic activity. The zeolitic molecular sieves containing the elemental metal and/or metal oxides exhibit catalytic activity.

The process of the present invention has a surface area about four times that expected with most alumina, silica or aluminosilicate supported metals thereby providing a greater surface area available for reaction. Since the external surface of the molecular sieve represents less than 1 percent of the total surface area it may be seen that there is an extremely large area available for chemisorption and catalysis in the internal portion of the molecular sieve. Since this region is available only through pores of molecular size it may be seen that selective chemisorption and catalysis may be obtained in a system containing a mixture of molecules some of which are too large to enter the pores whereas others are capable of entering the pores.

Zeolite A is described and claimed in U.S. Patent No. 2,882,243, issued April 14, 1959, to R. M. Milton.

Zeolite D is described and claimed in U.S. patent application Serial No. 680,383, filed August 26, 1957.

Zeolite L is described and claimed in U.S. patent application Serial No. 711,565, filed January 28, 1958, now abandoned.

Zeolite R is described and claimed in U.S. patent application Serial No. 680,381, filed August 26, 1957.

Zeolite S is described and claimed in U.S. patent application Serial No. 724,843, filed March 31, 1958.

Zeolite T is described and claimed in U.S. patent application Serial No. 733,819, filed May 8, 1958, now U.S. Patent No. 2,950,952.

Zeolite X is described and claimed in U.S. Patent No. 2,882,244, issued April 14, 1959 to R. M. Milton.

Zeolite Y is described and claimed in U.S. patent application Serial No. 728,057, filed April 14, 1958, now abandoned.

Iron, nickel, and/or cobalt-containing synthetic zeolites A, X, and Y, and natural zeolite faujasite have been found to be most satisfactory and useful for the purposes of the present invention.

Erionite is a naturally occurring zeolite, described originally by Eakle, Am. J. Science (4), 6, 66 (1898).

It is most readily identified by its characteristic X-ray powder diffraction pattern. The *d*-spacing, in A., and relative intensities thereof, obtained on a well-crystallized specimen are tabulated below.

X-RAY POWDER DATA, ERIONITE

| *d*-spacing, A. | Relative Intensity, $I/I_0 \times 100$ |
|---|---|
| 11.38 | 100 |
| 9.06 | 10 |
| 7.50 | 10 |
| 6.56 | 40 |
| 6.24 | 10 |
| 5.68 | 10 |
| 5.34 | 10 |
| 4.56 | 10 |
| 4.31 | 40 |
| 4.15 | 20 |
| 3.80 | 20 |
| 3.74 | 40 |
| 3.58 | 30 |
| 3.30 | 10 |
| 3.27 | 10 |
| 3.20 | 10 |
| 3.16 | 10 |
| 3.14 | 10 |
| 3.00 | 5 |
| 2.92 | 5 |
| 2.86 | 30 |
| 2.83 | 30 |
| 2.505 | 20 |
| 2.67 | 10 |
| 2.59 | 5 |
| 2.49 | 10 |
| 2.47 | 10 |
| 2.20 | 5 |
| 2.11 | 5 |
| 1.88 | 5 |
| 1.83 | 5 |
| 1.77 | 10 |
| 1.65 | 10 |

This is a continuation of copending application Serial No. 762,956, filed September 24, 1958, now abandoned in the names of D. W. Breck, C. R. Castor and R. M. Milton.

What is claimed is:

1. As a new composition of matter, a dehydrated rigid three-dimensional crystalline metal aluminosilicate zeolite of the molecular sieve type containing at least one elemental metal selected from the group consisting of iron, nickel, and cobalt in the inner adsorption region of said crystalline metal aluminosilicate zeolite, said crystalline metal aluminosilicate zeolite being characterized as being capable of adsorbing oxygen internally at the normal boiling point of oxygen.

2. A new composition of matter in accordance with claim 1 wherein the elemental metal is iron.

3. A new composition of matter in accordance with claim 1 wherein the elemental metal is nickel.

4. A new composition of matter in accordance with claim 1 wherein the elemental metal is cobalt.

5. As a new composition of matter, a dehydrated rigid three-dimensional crystalline metal aluminosilicate zeolite of the molecular sieve type selected from the group consisting of zeolite A, zeolite X, zeolite Y, and faujasite containing at least one elemental metal selected from the group consisting of iron, nickel and cobalt in the inner adsorption region of said crystalline metal aluminosilicate zeolite.

6. A new composition of matter in accordance with claim 5 wherein the elemental metal is iron.

7. A new composition of matter in accordance with claim 5 wherein the elemental metal is nickel.

8. A new composition of matter in accordance with claim 5 wherein the elemental metal is cobalt.

9. As a new composition of matter, dehydrated zeolite A containing at least one elemental metal selected from the group consisting of iron, cobalt and nickel.

10. As a new composition of matter, dehydrated zeolite X containing at least one elemental metal selected from the group consisting of iron, cobalt and nickel.

11. As a new composition of matter, dehydrated zeolite Y containing at least one elemental metal selected from the group consisting of iron, cobalt and nickel.

12. As a new composition of matter, dehydrated faujasite containing at least one elemental metal selected from the group consisting of iron, nickel and cobalt.

13. As a new composition of matter, a dehydrated rigid three dimensional crystalline metal aluminosilicate zeolite of the molecular sieve type containing at least one oxide of an elemental metal selected from the group consisting of iron, nickel, and cobalt in the inner adsorption region of said crystalline metal aluminosilicate zeolite, said crystalline metal aluminosilicate being characterized as being capable of adsorbing oxygen internally at the normal boiling point of oxygen.

14. A composition of matter as described in claim 13 wherein said crystalline metal aluminosilicate zeolite is zeolite A.

15. A composition of matter as described in claim 13 wherein said crystalline metal aluminosilicate zeolite is zeolite X.

16. A composition of matter as described in claim 13 wherein said crystalline metal aluminosilicate zeolite is zeolite Y.

References Cited in the file of this patent

UNITED STATES PATENTS

| 1,840,450 | Jaeger et al. | Jan. 12, 1932 |
| 2,306,610 | Barrer | Dec. 29, 1942 |
| 2,413,134 | Barrer | Dec. 24, 1946 |
| 2,617,712 | Bond | Nov. 11, 1952 |
| 2,882,243 | Milton | Apr. 14, 1959 |
| 2,882,244 | Milton | Apr. 14, 1959 |